March 30, 1965   C. L. HORTON   3,175,419
LOOM CRANK SHAFT GEARING
Filed April 15, 1963
Fig. 1.
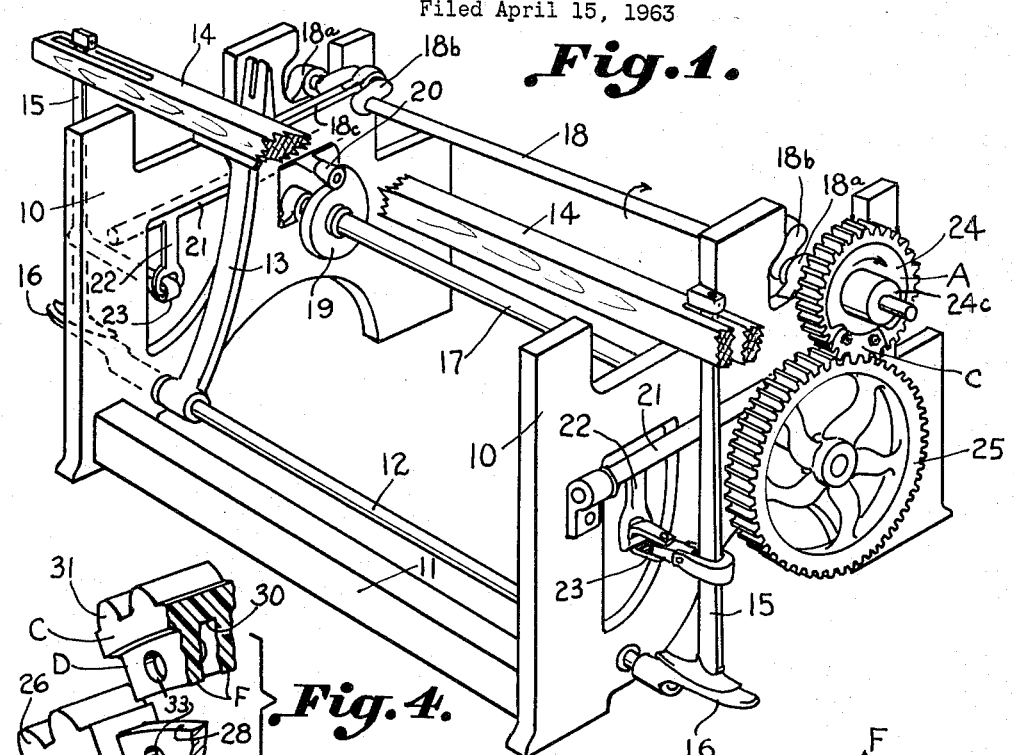
Fig. 4.
Fig. 2.
Fig. 3.
INVENTOR
CHARLES LLOYD HORTON
BY
ATTORNEY
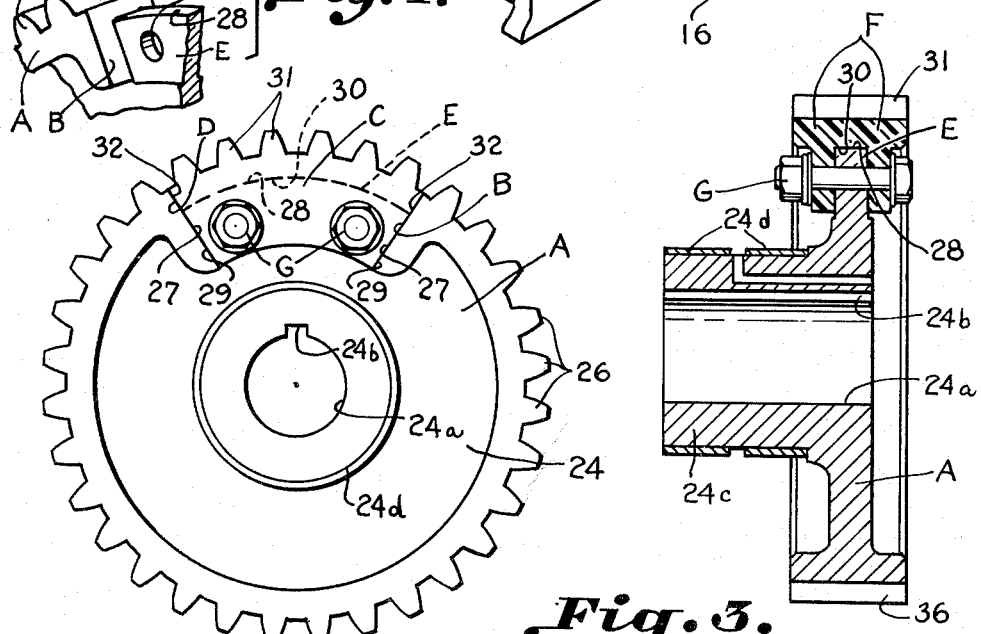

3,175,419
LOOM CRANK SHAFT GEARING
Charles Lloyd Horton, 9 Campbell St., Greenville, S.C.
Filed Apr. 15, 1963, Ser. No. 272,886
1 Claim. (Cl. 74—448)

This invention relates to textile looms and especially to an improved gearing arrangement for transferring motion from the crank shaft to the cam shaft.

It is common practice in the textile industry to use metallic gears of comparable hardness to transfer motion from the crank shaft to the cam shaft. Since the transfer always occurs with the same gear teeth in engagement and since the forces exerted upon the teeth by such transfer are most severe, such teeth of both the crank shaft gear and the cam shaft gear wear considerably more rapidly than the remaining teeth thereof. Any departure from close meshing tolerances results in increased wear upon all loom parts associated with the picking motion and a marked increase of noise, commonly referred to as a "hard pick." Such wear progresses so that both the crank shaft gear and the cam shaft gear must be replaced long before most of the teeth thereof are worn to any marked extent. Thus these expensive must be discarded when only partially worn and much loom down time is occasioned as a result of such replacement. Efforts have been made to solve this long existing problem, but none have proved satisfactory. Such efforts have included the provision of a removable metallic segment for the crank shaft gear positioned to mesh with the cam shaft gear upon the occurrence of the picking motion. This did not prove satisfactory because a "hard pick" still resulted and because excessive wear of the teeth of the cam shaft gear still occurred.

The present invention contemplates a solution of the problem by the provision of a segment constructed of wear resistant plastic material which is softer than the metal of which the cam shaft gear is constructed firmly seated within the crank shaft gear to avoid plastic deformation of the segment.

Accordingly, it is an important object of the present invention to provide an improved loom gearing arrangement for transferring motion from the crank shaft to the cam shaft without causing excessive wear on any of the teeth of either gear associated therewith.

Another important object of the invention is the provision of an improved loom gearing arrangement for transferring motion from the crank shaft to the cam shaft resulting in a "soft pick."

Another object of the invention is to provide an improved loom gearing arrangement for transferring motion from the crank shaft to the cam shaft avoiding wear on loom parts resulting from worn gear teeth.

Still another important object of the invention is the provision of such a gearing arrangement which avoids the premature discarding of expensive parts and avoids loom down time.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view illustrating a gearing arrangement constructed in accordance with the invention, FIGURE 2 is a front elevation of the crank shaft gear illustrated in FIGURE 1, FIGURE 3 is a transverse sectional elevation of the crank shaft gear, and FIGURE 4 is a perspective view illustrating the gearing arrangement.

The drawing illustrates a loom having a cam shaft gear driven by a crank shaft gear for exerting a picking motion. The crank shaft gear includes a first gear segment A constructed of a rigid metallic material having a plurality of spaced teeth meshing with the cam shaft gear. The first gear segment A has a seat B having sides and a base. A second gear segment C has a seat D having sides and a base mating with said first mentioned sides and base. The seat B has a web portion E for fastening the second gear segment thereto, said second gear segment having a web portion F engaging the web portion E. A plurality of spaced teeth are carried by the second gear segment meshing with the cam shaft gear and having continuity with the teeth of the first mentioned gear segment. The second gear segment is positioned so that the teeth thereof mesh with the teeth of the cam shaft gear when the picking motion is transferred. The second gear segment is constructed of a high density plastic material which is softer than the metal of which the cam shaft gear is constructed. Means G securely fasten the second segment within the seat within the first gear segment so that the second gear segment is securely seated so as to avoid plastic deformation.

The loom frame illustrated has spaced side portions 10 bridged by the usual front girt 11. The shaft 12 carries the usual lay swords such as illustrated at 13. The lay swords carry the lay 14 across which the shuttle is propelled by the picker sticks 15. The picker sticks are positioned upon parallel motions 16 carried by the shaft 12.

The invention is concerned with the means for transferring motion from the driven crank shaft 18 to the cam shaft 17 for transferring the picking motion to the picker sticks 15. The various parts of the loom concerned with the picking motion are illustrated in FIGURE 1 in position preparatory to a picking motion being imparted to the picker sticks 15. The pick cam 19 carried by the cam shaft 17 imparts a forward motion to cam followers as illustrated at 20. The forward motion of the cam follower results in rotation of shafts 21 imparting, through the links 22, an inward motion to the lug strap 23 carried by the free end of the links 22.

The crank shaft 18 is driven in a clockwise direction in FIGURE 1 by the loom motor and imparts therefrom, through its crank shaft or crown gear 24, rotation to the cam shaft gear 25. The crank shaft gear 24 has a bore 24a therein for accommodating the crank shaft 18, and a keyway 24b for fixing the gear to the shaft 18. The crank shaft 18 is mounted within bearings 18a carried by the frame members 10, and has crank portions 18b thereon for oscillating the lay back and forth through the connecting rods as illustrated at 18c. The bore 24a and the keyway 24b extend through the hub 24c of the crank shaft gear 24. The hub 24c carries steel bushings 24d for rotation of a friction gear (not shown) thereon. The segment A of the crank shaft gear 24 has spaced teeth 26 thereon about its periphery. The gear segment A has a seat B therein for accommodating the plastic insert C. The seat B has side walls 27, which preferably diverge from the center of the gear 24, and a base 28.

The insert C is constructed of a high density lineal polyethylene synthetic material, preferably of a type known as POLYDUR. Such material is softer than the metal of which the cam shaft gear is constructed and minimizes wear thereon. Since the POLYDUR is highly resistant to wear, the gears mesh properly so as to avoid excessive wear to the other parts of the loom. The second gear segment C has side portions 29 conforming to the sides 27, and a base portion 30 conforming to the base portion 28. The second segment C also has a number of spaced gear teeth 31 conforming to the gear teeth 26. The gear segments preferably join at a point between gear teeth, bisecting the space between gear teeth, as illustrated at 32. The seat B has a web portion E which engages web portions F so as to exert a uniform support for the inserted gear segment C so as to avoid plastic deformation. The insert C is fixedly positioned within the seat B, and is preferably removably secured therein by the fastening means G passing through apertures 33 in the web portions E and F.

It is thus seen that a problem long existent in the art of weaving has been solved through the combination of elements described herein. The use of a plastic material such as POLYDUR has been made possible through providing a positive seating arrangement for a gear segment constructed thereof, at the point of excessive wear of the crank shaft gear. Thus plastic deformation, such as would result if the entire gear were made of plastic, has been avoided.

While a preferred embodiment of the invention has been described using specific terms, such description is for illustrative purposes only, and it is to be understood that changes and variations may be made without departing from the spirit or scope of the following claim.

What is claimed is:

In combination a loom having a cam shaft gear driven by a crank shaft gear for exerting a picking motion, said crank shaft gear comprising, a first gear segment constructed of a rigid metallic material, a plurality of spaced teeth meshing with the cam shaft gear carried by said first gear segment, a seat having sides and a base carried by said first gear segment, a second gear segment constructed of a plastic material which is softer than the metal of which the cam shaft gear is constructed, a seat having sides and a base mating with said first mentioned sides and base carried by said second gear segment, said seat carried by said first gear segment having a first web portion for fastening the second gear segment thereto, said second gear segment having a second web portion engaging the first web portion, a plurality of spaced teeth carried by said second gear segment meshing with the cam shaft gear and having continuity with the teeth of the first mentioned gear segment, said second gear segment being positioned so that the teeth thereof mesh with the teeth of the cam shaft gear when the picking motion is exerted, and means securely fastening said second segment within the seat carried by the first gear segment, whereby the seats of the first and second gear segments are securely mated so as to avoid plastic deformation of the second gear segment.

References Cited by the Examiner
UNITED STATES PATENTS 1,436,652  11/22  Goedert _____ 74—448

OTHER REFERENCES

Machine Design, volume 33, No. 3, Feb. 2, 1961, page 148.

DON A. WAITE, *Primary Examiner.*